US008615794B1

(12) United States Patent
Tomilson et al.

(10) Patent No.: US 8,615,794 B1
(45) Date of Patent: Dec. 24, 2013

(54) METHODS AND APPARATUS FOR INCREASED SECURITY IN ISSUING TOKENS

(71) Applicant: Ping Identity Corporation, Denver, CO (US)

(72) Inventors: Scott Tomilson, Vancouver (CA); Brian Campbell, Denver, CO (US)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 13/737,525

(22) Filed: Jan. 9, 2013

(51) Int. Cl.
 *G06F 21/00* (2013.01)
(52) U.S. Cl.
 USPC ................. 726/6; 726/9; 713/182; 713/185
(58) Field of Classification Search
 USPC .................... 726/9, 26–29; 713/172
 See application file for complete search history.

(56) References Cited

U.S. PATENT DOCUMENTS

| | | | |
|---|---|---|---|
| 7,500,262 B1 | 3/2009 | Sanin et al. | |
| 8,060,448 B2 * | 11/2011 | Jones | 705/65 |
| 8,266,684 B2 * | 9/2012 | Kline et al. | 726/9 |
| 8,347,355 B2 * | 1/2013 | Mower et al. | 726/3 |
| 8,473,749 B1 | 6/2013 | Madsen et al. | |
| 2003/0200202 A1 * | 10/2003 | Hsiao et al. | 707/3 |
| 2005/0240763 A9 | 10/2005 | Bhat et al. | |
| 2006/0070114 A1 | 3/2006 | Wood et al. | |
| 2008/0256616 A1 * | 10/2008 | Guarraci et al. | 726/9 |
| 2009/0113527 A1 | 4/2009 | Naaman et al. | |
| 2010/0257578 A1 * | 10/2010 | Shukla et al. | 726/1 |
| 2011/0265173 A1 | 10/2011 | Naaman et al. | |
| 2011/0296522 A1 * | 12/2011 | Speyer et al. | 726/20 |
| 2011/0321131 A1 * | 12/2011 | Austel et al. | 726/4 |
| 2012/0110646 A1 * | 5/2012 | Ajitomi et al. | 726/4 |
| 2012/0117626 A1 * | 5/2012 | Yates et al. | 726/4 |
| 2012/0144202 A1 | 6/2012 | Counterman | |
| 2012/0291090 A1 * | 11/2012 | Srinivasan et al. | 726/1 |
| 2012/0291114 A1 * | 11/2012 | Poliashenko et al. | 726/8 |
| 2013/0007864 A1 * | 1/2013 | Puflea | 726/7 |
| 2013/0086679 A1 * | 4/2013 | Beiter | 726/22 |

OTHER PUBLICATIONS

"Migrating tokens to system accounts," Twitter Developers, Nov. 7, 2011, Retrieved from the Internet: <URL: http://www.dev.twitter.com/docs/ios/migrating-tokens-core-accounts/> (3 pages).

(Continued)

*Primary Examiner* — Linglan Edwards
(74) *Attorney, Agent, or Firm* — Cooley LLP

(57) ABSTRACT

In some embodiments, an apparatus includes an authorization module implemented in at least one of a memory or a processing device. The authorization module receives at a first time and from a first mobile application, a request for an access token associated with a second mobile application that includes an identifier associated with the second mobile application and a first random verification identifier. The authorization module provides to the first mobile application a signal representing an authorization code associated with the access token. The authorization module receives from the second mobile application at a second time a signal representing the authorization code, the identifier associated with the second mobile application, and a second random verification identifier. The authorization module provides a signal representing the access token to the second mobile application based in part on the first random verification identifier being equal to the second random verification identifier.

20 Claims, 3 Drawing Sheets

(56) References Cited

OTHER PUBLICATIONS

"API requests with TWRequest" Twitter Developers, Jan. 5, 2012, Retrieved from the Internet: <URL: http://www.dev.twitter.com/docs/ios/making-api-requests-twrequest> (3 page).
Ryan Whitwam, "How Android Smartly Manages Your Accounts and Logins," Tested News, Jun. 8, 2011, Retrieved from the Internet: <URL: http://www..tested.com/news/feature/2437-how-android-smartly-manages-your-accounts-and-logins/> (4 pages).
"iOS Twitter framework," Twitter Developers, Dec. 5, 2011, Retrieved from the Internet: <URL: http://dev.twitter.com/docs/ios> (3 pages).
"AccountManager," Android Developers, Retrieved from the Internet: <URL: http://developer.android.com/reference/android/accounts/AccountManager.html>, Jan. 18, 2012 (11 pages).
"PackageManager," Android Developers, Retrieved from the Internet: <URL: http://developer.android.com/reference/android/content/pm/PackageManager.html>, Jul. 9, 2012 (41 pages).
"Authenticating to OAuth2 Services", Android Developers, Retrieved from the internet: http://developer.android.com/training/id-auth/authenticate.html, Jan. 2, 2013.
"Google Play Services", Android Developers, Retrieved from the Internet: https://developer.android.com/google/play-services/index.html, Jan. 2, 2013.
"Partner Programs Allow Mobile Application Developers to Easily Integrate with Active Directory Authentication and Deliver 'Zero Sign-On' to Enterprise Users", Oct. 18, 2012.
G. Fletcher, et al. "Oauth Use Cases draft-ietf-oauth-use-cases-00", May 23, 2012, pp. 1-23.
Office Action mailed Oct. 2, 2012 for U.S. Appl. No. 13/544,565, filed Jul. 9, 2012.
Office Action mailed Oct. 9, 2012 for U.S. Appl. No. 13/544,553, filed Jul. 9, 2012.
"Using OAuth 2.0 to Access Google APIs," Google Developers, Jun. 26, 2012, Retrieved from the Internet: <URL: https://developers.google.com/accounts/docs/OAuth2>, 6 pgs.
"Integrating OAuth with Mobile Apps," Travis Spencer—Software Engineer, Sep. 2, 2011, Retrieved from the Internet: <URL: http://travisspencer.com/blog/2011/09/integrating-oauth-with-mobile.html> , 4 pgs.
"Single Sign on Authentication," AuthenticationWorld.com, The business of Authentication, © 2006 Huntington Ventures Ltd., Retrieved from the Internet: <URL: http://www.authenticationworld.com/Single-Sign-On-Authentication/,> 2 pgs.
Office Action mailed Mar. 4, 2013 for U.S. Appl. No. 13/544,565, filed Jul. 9, 2012.
Office Action mailed May 24, 2013 for U.S. Appl. No. 13/774,653, filed Feb. 22, 2013.

\* cited by examiner

US 8,615,794 B1

METHODS AND APPARATUS FOR INCREASED SECURITY IN ISSUING TOKENS

BACKGROUND

Some embodiments described herein relate generally to methods and apparatus for an authorization server to authenticate an application installed on a mobile communication device before issuing a token for the application. In particular, but not by way of limitation, some embodiments described herein relate to methods and apparatus of authenticating an application by using a randomly-generated verification identifier unique to the application before issuing a token for the application.

Open Authorization (OAuth) is an open standard protocol for authorization, and allows a user, such as an enterprise employee, to grant a third party application access to information associated with that user stored at a given location (e.g., on given website), without sharing that user's account credentials (e.g., password) or the full extent of that user's data. Some known systems use OAuth tokens to authenticate applications for users of a variety of communication devices (e.g., a laptop computer, a personal digital assistant (PDA), a standard mobile telephone, a tablet personal computer (PC), etc.). If the OAuth Authorization Server is unable to authenticate an application before issuing a token, malicious software may be able to obtain the token issued for a valid application and use that token in making application programming interface (API) calls and impersonate the valid application.

Accordingly, a need exists for methods and apparatus for an OAuth Authorization Server to authenticate an application installed on a mobile communication device before issuing a token to that application.

SUMMARY

In some embodiments, an apparatus includes an authorization module implemented in at least one of a memory or a processing device. The authorization module receives at a first time and from a first mobile application, a request for an access token associated with a second mobile application that includes an identifier associated with the second mobile application and a first random verification identifier. The authorization module provides to the first mobile application a signal representing an authorization code associated with the access token. The authorization module receives from the second mobile application at a second time a signal representing the authorization code, the identifier associated with the second mobile application, and a second random verification identifier. The authorization module provides a signal representing the access token to the second mobile application based in part on the first random verification identifier being equal to the second random verification identifier.

DETAILED DESCRIPTION

Figure 1:
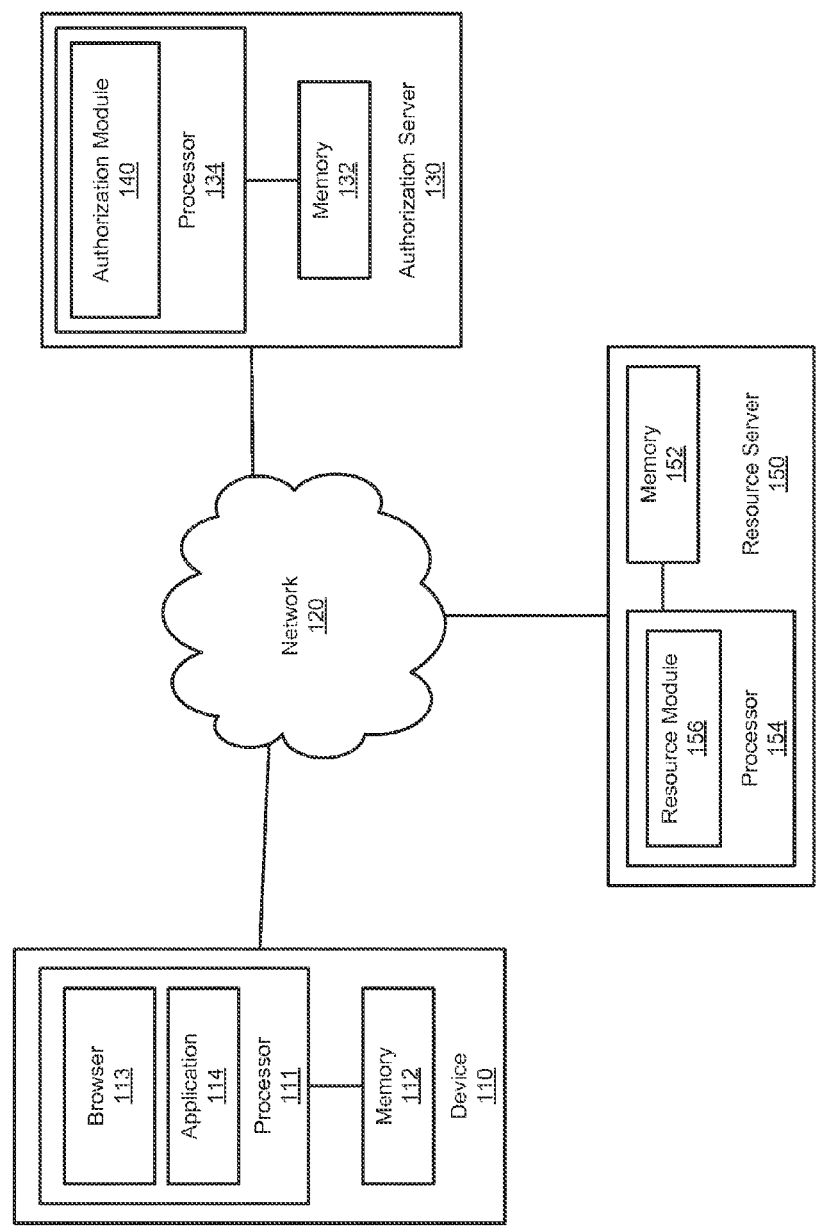
FIG. 1 is a schematic illustration of an access token issuing system, according to an embodiment.

In some embodiments, an apparatus includes an authorization module implemented in at least one of a memory or a processing device. The authorization module is configured to receive at a first time and from a first mobile application, a request for an access token associated with a second mobile application. The request includes an identifier associated with the second mobile application and a first random verification identifier. The authorization module is configured to provide to the first mobile application and in response to the request a signal representing an authorization code associated with the access token. The authorization module is configured to receive from the second mobile application and at a second time after the first time a signal representing the authorization code, the identifier associated with the second mobile application, and a second random verification identifier. The authorization module is configured to provide a signal representing the access token to the second mobile application based at least in part on the first random verification identifier being equal to the second random verification identifier.

In some embodiments, a non-transitory processor-readable medium includes code to cause a processor to receive at a first time and from a first mobile application a request for an access token associated with a second mobile application. The request includes an identifier associated with the second mobile application and a verification identifier generated by the second mobile application. The code causes the processor to provide to the first mobile application a signal representing an authorization code associated with the access token in response to the request. The code also causes the processor to receive from the second mobile application and at a second time after the first time a signal representing the authorization code, the identifier associated with the second mobile application, and the verification identifier. The code further causes the processor to provide a signal representing the access token to the second mobile application when the authorization code, the identifier associated with the second mobile application, and the verification identifier are verified.

In some embodiments, an apparatus includes a first mobile application implemented in at least one of a memory or a processing device. The first mobile application is configured to generate a random verification identifier and initiate a second mobile application such that the second mobile application sends a signal representing the random verification identifier and an identifier associated with the first mobile application to an authorization module at a first time. The first mobile application is configured to receive a signal representing an authorization code provided by the authorization module based on the authorization code being within an address associated with the first mobile application at a second time after the first time. The first mobile application is configured to provide a signal representing the random verification identifier and the authorization code to the authorization module. The first mobile application is configured to receive a signal representing an access token associated with the first mobile application based at least in part on the authorization module validating the random verification identifier and the authorization code.

As used in this specification, the singular forms "a," "an" and "the" include plural referents unless the context clearly dictates otherwise. Thus, for example, the term "a device" is intended to mean a single device or a combination of devices.

FIG. 1 is a schematic illustration of an access token issuing system 100, according to an embodiment. The access token issuing system 100 includes a device 110, a network 120, an authorization server 130 and a resource server 150. The network 120 can be any type of network (e.g., a local area network (LAN), a wide area network (WAN), a virtual network, a telecommunications network) implemented as a wired network and/or wireless network. As described in further detail herein, in some embodiments, for example, the device 110 can be connected to the authorization server 130 and the resource server 150 via an intranet, an Internet Service Provider (ISP) and the Internet, a cellular network (e.g., network 120), and/or the like.

The device 110 can be any mobile communication or computing device such as a laptop computer, a personal digital assistant (PDA), a standard mobile telephone, a tablet personal computer (PC), and/or so forth. The device 110 includes a memory 112 and a processor 111. The device 110 can be configured to generate random verification identifiers, and request and receive access tokens from the authorization server 130. The device 110 can also be configured to request application data from the resource server 150 (e.g., by sending access tokens to the resource server 150) and to receive application data from the resource server 150 via the network 120 as described in further detail herein.

The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 stores instructions to cause the processor to execute modules, processes and/or functions associated with such an access token issuing system 100.

The processor 111 can be a general purpose processor, a Field Programmable Gate Array (FPGA), an Application Specific Integrated Circuit (ASIC), a Digital Signal Processor (DSP), and/or the like. The processor 111 can be configured to run and/or execute applications and/or other modules, processes and/or functions associated with an access token issuing system 100. The processor 111 includes a browser 113 and an application 114.

The application 114 can be any native mobile application installed on the device 110 or a web-browser-based application. The application 114, for example, can be configured to receive access tokens from the authorization module 140 and cause the processor 111 to execute specific operations associated with particular functions in an enterprise. For example, the application 114 can be an accounting application, a sales application, a payroll application and/or the like. In other configurations, application 114 can be any other enterprise or third party application configured to be run and/or executed at the device 110.

A mobile application 114 can be configured to generate a random verification identifier (e.g., a string of random or pseudo-random numbers such as a cryptographic nonce) and initiate another mobile application such as, for example, the browser 113 such that this other mobile application can send a signal representing the random verification identifier and an identifier associated with the application 114 to an authorization module 140 at a first time. Note that the browser 113 is a specific example of a native mobile application in the specific instance described herein. In other instances, the browser 113 need not be considered as a native mobile application but instead can be considered as and functions as a browser independent of application 114. The application 114 can be configured to receive a signal representing an authorization code provided by the authorization module 140 based on the authorization code being within an address associated with the application 114 at a second time after the first time. The application 114 can provide a signal representing the random verification identifier and the authorization code to the authorization module 140. The application 114 is also configured to receive a signal representing an access token associated with the application 114 based in part on the authorization module 140 validating the random verification identifier and the authorization code.

The browser 113 can be any native mobile browser installed on the device 110 such as, for example, the Android browser, the Blackberry browser, Safari, Internet Explorer Mobile browser, Firefox for mobile browser, and/or the like. The browser 113 can connect to the Internet via, for example, a cellular network and/or a wireless local area network (LAN), using standard Hypertext Transfer Protocol (HTTP) over Transmission Control Protocol/Internet Protocol (TCP/IP), and can display web pages written in, for example, HyperText Markup Language (HTML), Extensible HyperText Markup Language (XHTML Mobile Profile WAP 2.0), Wireless Markup Language (WML), and/or the like.

The browser 113 can be configured to be initiated by the application 114 and send a request signal for an access token associated with the application 114 to an authorization module 140 at a first time. The request signal can include the random verification identifier generated by the application 114 and an identifier associated with the application 114. The browser 113 can also be configured to send to the authorization module 140 a signal representing approval to provide an access token to the application 114 before the authorization module 140 provides an authorization code associated with the access token to the browser 113.

The authorization server 130 can be, for example, a web server, an application server, a proxy server, a telnet server, a file transfer protocol (FTP) server, a mail server, a list server, a collaboration server and/or the like. The authorization server 130 can receive from a first mobile application such as, for example, the browser 113 in the device 110, a signal requesting an access token associated with a second mobile application such as, for example, the application 114 in the device 110. The authorization server 130 can send a signal representing an authorization code associated with the access token to the first mobile application in response to the request signal via the network 120. The authorization server 130 can also execute modules, processes and/or functions associated with such an access token issuing system 100. The authorization server 130 can be, for example, an OAuth 2.0 authorization server. OAuth 2.0 defines a standardized messaging protocol by which a native application installed on a mobile communication device can obtain security tokens such as, for example, access tokens from an authorization server. OAuth 2.0 is described in detail in "The OAuth 2.0 Authorization Framework", dated October 2012, which is incorporated herein by reference in its entirety. These security tokens can then be included by the application on its application programming interface (API) calls to a resource server such as resource server 150 to authenticate before obtaining application data.

The authorization server 130 includes a processor 134 and a memory 132. The memory 132 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 132 can store instructions to cause the processor 134 to execute modules, processes and/or functions associated with such an access token issuing system 100 (e.g., authorization module 140).

The processor 134 can be a general purpose processor, a Field Programmable Gate Array (FPGA), an Application Specific Integrated Circuit (ASIC), a Digital Signal Processor (DSP), and/or the like. In some configurations, processor 134 can be configured to run and/or execute application modules, processes and/or functions associated with such an access token issuing system 100. For example, processor 134 can be configured to run and/or execute modules, processes, and/or functions associated with or in response to access token requests (e.g., authorization module 140). As shown the processor 134 includes an authorization module 140.

The authorization module 140 can be a hardware and/or software module (stored in memory 132 and/or executed in a processor 134) that can receive at a first time and from a first mobile application such as, for example, the browser 113 in the device 110, a signal requesting an access token associated with a second mobile application such as, for example, the application 114 in the device 110. In some instances, the browser 113 can part of another native mobile application. In the context of the access token issuing system 100 described in FIG. 1, however, the browser 113 is considered as a specific example of a native mobile application. The request signal can include an identifier associated with the second mobile application, and a first random verification identifier. Upon receiving the request signal, the authorization module 140 can send a signal via the network 120 to the browser 113 to provide user approval (or authentication) information. Upon receiving the user approval information from the browser 113, the authorization module 140 can authenticate the user as described in greater detail herein. Upon successful authentication of the user, the authorization module 140 can send a signal representing an authorization code associated with the access token to the first mobile application (browser 113) in response to the request signal via the network 120. As described in further detail herein, the first mobile application (browser 113) can send the signal representing the authorization code to the second mobile application (application 114) via, for example, the operating system of the device 110. The authorization module 140 can receive, from the second mobile application and at a second time after the first time, a signal representing the authorization code, the identifier associated with the second mobile application, and a second random verification identifier. The authorization module 140 can be configured to generate and/or define access tokens for the application 114 on the device 110. The authorization module 140 can provide a signal representing the access token to the second mobile application based in part on the first random verification identifier being equal to the second random verification identifier, as described in further detail herein. The authorization module 140 can also be configured to not provide the first random verification identifier to the first mobile application or the second mobile application for maintaining security.

The resource server 150 can either be a server associated with the enterprise (such as a company) that is associated with the authorization server 130 or a third party server distinct from the enterprise that is associated with the authorization server 130. The resource server 150 can be, for example, a Software as a Service (SaaS) host that is a web server, a proxy server, a telnet server, a file transfer protocol (FTP) server, a mail server, a list server, a collaboration server, and/or the like.

The resource server 150 includes a processor 154 and a memory 152. The memory 152 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some configurations, the memory 152 can store instructions to cause the processor 154 to execute modules, processes and/or functions associated with the application server 150 within the access token issuing system 100 (e.g., resource module 156).

The resource module 156 can be a hardware and/or software module (stored in memory 152 and/or executed in a processor 154) configured to provide application data to applications 114 via the network 120. For example, the application data can include results of external market analysis for a product of the enterprise and/or the like. This application data can be used by the application 114, for example, to set the retail price of the product, to calculate the expected profit levels for the product, to determine locations for the best retail vendors available for the product, and/or the like. In other words, the application data can be related to the type of application: sales data for a sales-related application, financial data for a financial application, etc. The resource module 156 can receive and process an access token from the application 114 of the device 110 prior to providing application data to the application 114. Such application data can enable the application 114 to execute modules, processes and/or functions associated with the device 110.

Figure 2:
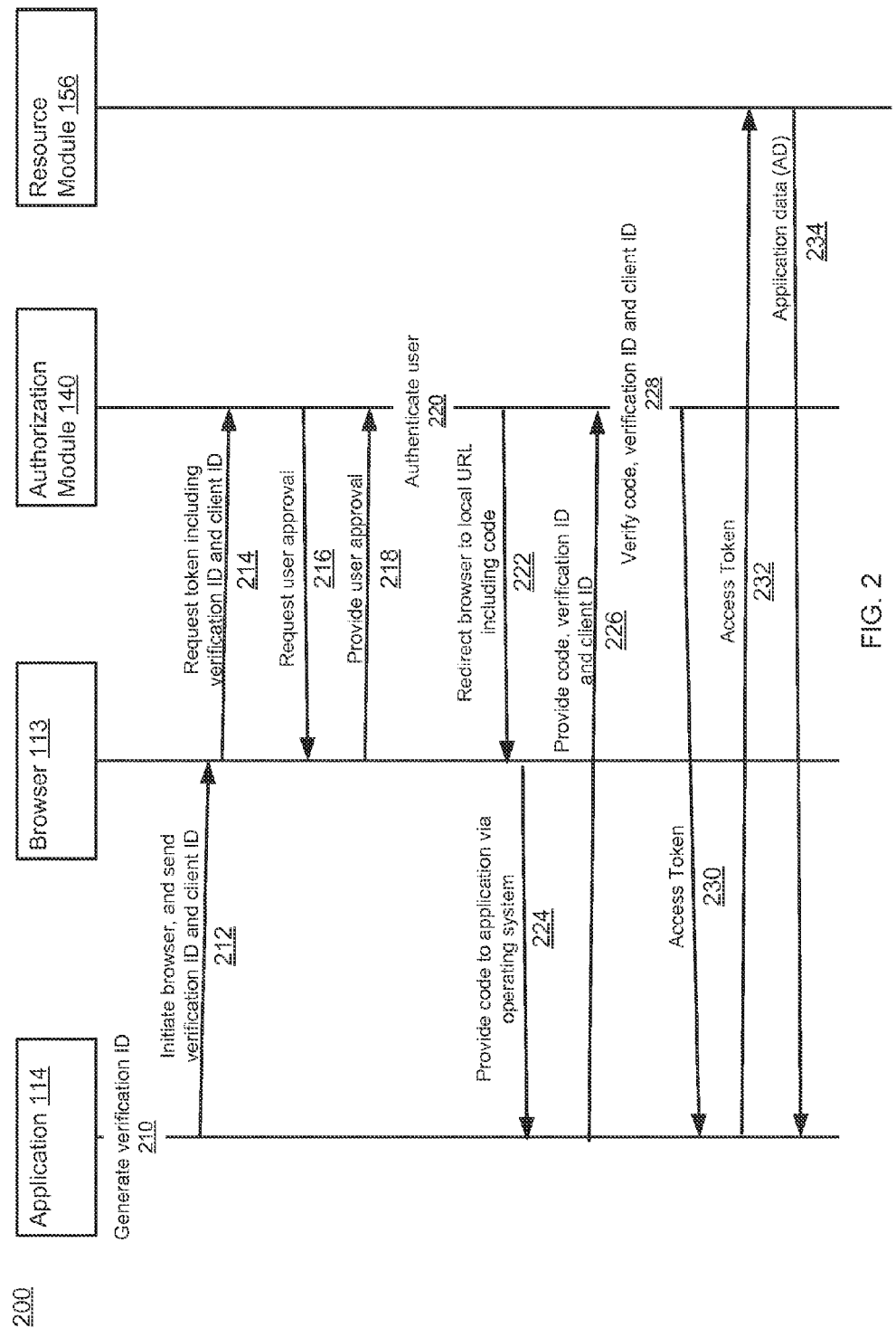
FIG. 2 is a message flow diagram illustrating a method for approving a user of an application on a device and issuing the application an access token to access application data, according to an embodiment.

FIG. 2 is a message flow diagram illustrating a method 200 for approving a user of an application 114 on a device 110 and issuing the application 114 an access token to access application data in an access token issuing system 100, according to an embodiment. This embodiment includes the application 114 generating a unique verification ID and adding the verification ID to both (1) the request for the authorization code associated with the access token and (2) when exchanging the authorization code for the access token. At 210, the application 114 generates a unique verification ID at the beginning of a communication session. The verification ID is used by the application 114 to authenticate itself to the authorization server 140 before obtaining the access token from the authorization server 140. The verification ID can be, for example, a string of arbitrary random or pseudo-random numbers (e.g., a cryptographic nonce) issued in step 210 to ensure that this verification ID is not reused in any replay attacks. To ensure that the verification ID is used only once, the verification ID can be made to be time-variant by including a suitably fine-grained timestamp in its value or can be generated with enough random bits to ensure a probabilistically insignificant chance of repeating a previously generated value.

At 212, the application 114 initiates the browser 113 by launching the browser 113 and sends a signal representing the verification ID and a client ID associated with the application 114 to the browser 113. Upon launching, the application 114 can send a signal representing a URL associated with the address of the authorization module 140 to the operating system of the mobile device 110. The operating system can then launch the browser 113 to fetch the URL associated with the address of the authorization module 140.

The client ID can include an encrypted or an unencrypted form of an application identity number that has been assigned to the application 114 (by the authorization module 140). In some instances, the client ID can also include, for example, additional encrypted or unencrypted application credentials such as the version of the application 114, the features of the application 114 that are accessible to the user of the device 110, a device 110 identifier, an identifier associated with the user of the device 110, and/or the like.

At 214, the browser sends a signal requesting the access token for the application 114 to the authorization module 140 via the network 120. The request signal can include the verification ID and the client ID associated with the application 114. Upon receiving the request signal, the authorization module 140 can store the association between the first verification ID and the client ID. Upon receiving the request signal, the authorization module 140 can also send a signal via the network 120 to the browser 113 to request user approval (or authentication) information, at 216. Such user approval request signal can, for example, redirect the browser 113 to an OAuth authorization server 140 login page where the user can enter the information used for authentication of the user with respect to the OAuth authorization server 140.

At 218, the browser 113 sends a signal that contains user approval information to the authorization module 140 via the network 120. The user approval (or authentication) information can include, for example, an identifier unique to each user of the device 110 using the OAuth 2.0 protocol. The identifier associated with each user can include, for example, a user login, a user password, an employee ID number, a personal identification number (PIN), biometric information (e.g., data associated with a fingerprint scan, a retinal scan, etc.), an employee security/access level, an enterprise division code, and/or the like. Note that in some instances, the identifier can be unique to the user and the application 114. For example, a specific user can have different passwords for different applications installed on the device 110.

The authorization module 140 receives the user approval (or authentication) signal from the browser 113 via the network 120 and authenticates the user, at 220. In some instances, the authorization module 140 can authenticate the user by matching the user authentication information to a specific entry in a user authentication database or a look-up table stored in the memory 132 of the authorization server 130. The user authentication database can include, for example, a list of employees and their corresponding employment positions and security/access level, social security numbers, employee personal identification numbers (PIN), employee passwords, and/or the like. In other configurations, the user authentication database can be stored in the memory of another device (e.g., a server not shown in FIGS. 1 and 2) operatively coupled to the network 120. The authorization module 140 can authenticate the user using any suitable authentication protocol such as, for example, Secure Sockets Layer (SSL), Secure Shell (SSH), Kerberos, and/or the like.

Upon successful authentication of the user, the authorization module 140 can generate an authorization code associated with the access token. The authorization code can be, for example, a string of arbitrary random or pseudo-random numbers generated by the authorization module 140 that is mapped to the access token for a given application. The authorization module 140 can send to the browser 113 a signal that redirects the browser 113 to a device or resource within network 120 and that includes the authorization code via a uniform resource locator (URL) represented by the signal, at 222. The URL provided is formatted in a scheme that the application 114 is configured to handle (the scheme of the URL provided is not recognized by the browser 113). When an application 114 is installed on a mobile device, the application 114 registers itself with the operating system of the mobile device as a handler of a uniform resource locator (URL) of a given scheme such as, for example, URLs of the form 'nativeapp_a://rest_of_url". The scheme of the URL represented by the signal sent by the authorization module 140 is only recognizable by the application 114 (and not the browser) because the valid application 114 (and not any other application) is designed to be able to access the authorization code that can be exchanged for the access token. If the scheme of the URL represented by the signal sent by the authorization module 140 was otherwise recognizable by the browser, a possibility exists that the browser (and not the valid application) might obtain the authorization code—a situation that can be avoided by the application 114 registering itself with the operating system. The authorization code can be random or pseudo-random string of numbers that is generated at the authorization module 140 that is uniquely associated with the access token for an application 114 installed on the device 110 for a user. In some configurations, after the authorization module 140 generates the authorization code for the first time for an application, the authorization module 140 can store the authorization code along with the access token and the verification ID for an application 114 in a database in the memory 132 of the authorization server 130 for access in the future. In other configurations, the new authorization code can be generated by the authorization module 140 each time an access token is requested by an application 114 and the authorization code can be made time variant by including a suitably finegrained timestamp in its value.

Because the URL scheme used by the authorization module 140 to format the signal is not recognizable by the browser 113, the browser 113 sends the URL to the operating system. The signal or portion of the signal representing the same URL scheme is registered at the authorization module 140 and the operating system of the mobile device 110 as being associated with the particular application 114. For example, a database or lookup table can exist in the memory of the authorization server 132 and the memory of the device 112, and this database or lookup table can contain entries associated with different applications and the URL's each application can handle. On receiving the URL from the browser 113, the operating system of device 110 can search the database or lookup table to detect or determine whether the specific URL scheme associated with the URL is supported by the device 110 and if so, determine what applications 114 have used the URL scheme to register itself on the device 110. On detecting the application 114 that can handle that URL scheme, the operating system sends the signal or portion of the signal representing the URL with the authorization code to the application 114, at 224.

The application 114 can access the authorization code contained in the URL and generate a second verification ID. In some instances, the application 114 can retrieve the original verification ID from the memory of the device instead of generating a second verification ID. The application 114 can send a signal representing the authorization code, the verification ID and the client ID to the authorization module 140 without going through the browser 113 via the network 120, at 226.

At 228, the authorization module 140 can receive via the network 120, the signal representing the authorization code, the verification ID and the client ID from the application 114, and can assess the validity of and/or verify the attributes of the authorization code, the verification ID and the client ID. In some instances, the authorization module 140 can perform this verification by querying a database or a look-up table stored in the memory 132 of the authorization server 130 for an entry that corresponds to the authorization code and/or the verification ID and/or the client ID. In other instances, the database or look-up table can be stored in the memory of a different server operatively coupled to the network 120. For example, the authorization module 140 can acknowledge if an authorization code for an application 114 of an authorized user of the communication device 110 has been received. In another example, the authorization module 140 can use the authorization code, the verification ID and the client ID to query a second database or lookup table stored the memory of the authorization server 130 that can contain entries that list the approved functionalities of each application for an authenticated user. The authorization module 140 can acknowledge if the approved functionalities of the application 114 has been activated for the user. In yet another example, the authorization module 140 can acknowledge if the time stamp on the verification ID and/or the client ID is valid, and/or the like.

Upon verifying the authorization code, the verification ID and the client ID, the authorization module 140 can generate and/or define an access token for the requested application 114 installed on the device 110. Note that the access token can be generated at this point when the verification ID sent by the application 114 (after obtaining the authorization code—step 226) is equal to the original verification ID (stored in the memory of the authorization server) and will not be generated when they differ. The two verification ID's differing is an indication that the application that generated the signal requesting the access token is not the same application that initiated the process of user authentication and access token generation. Accordingly, the verification ID can be used to verify that the application that generated the signal requesting the access token is not malicious code posing as the application that initiated the process of user authentication and access token generation.

In some instances, the access token can include an encrypted or unencrypted form of a user personal identity number (PIN), a user security/access level, a device identification number, an internet protocol (IP) and/or media access control (MAC) address of the device, an application identity number, an address of the authorization module 140, and/or the like. In other instances, the access token can include additional encrypted or unencrypted application credentials such as the specific features and/or resources of the application 114 that has been approved for the user, a duration for which the access token is valid, and/or the like. In some instances, the access token can be, for example, an Open Authorization (OAuth) token, an OpenID token, a SecurID token, and/or the like. Upon generating the access token, the authorization module 140 can send the access token to the application 114 via the network, at 230.

The application 114 can send the access token to the resource module 156 directly via the network (i.e. not through the browser), at 232. Upon successfully receiving the access token, the resource module 156 can, at 234, send application data via the network 120 to the application 114 in a data package (e.g., a JavaScript Object Notation (JSON) package) for use during execution of the application 114 on the device 110. For example, if the application 114 is a sales application, the application data can include a representation of the price of a unit of a product, the number of units sold in a month, the number of units in pending orders, the revenue generated from all sales in a month, the profits earned in a month, and/or the like. In some instances, the application 114 can use the application data to populate a table for display to the user. In another example, if the application 114 is a human resource (HR) application, the application data can include a user employee number, a user social security number, an employee status code, an enterprise code for paid time off (PTO), and/or the like. In some instances, the application 114 can allow the user to use this data to calculate the total number of hours worked that can be charged to the enterprise in a pay cycle, and/or the like.

The access token issuing system as described in FIG. 2 involves the generation of a first and a second verification ID by the (valid) application 114 (or the generation and the retrieval of a valid verification ID by the application 114) during the request for the authorization code (step 214) and request for the access token (step 226). An access token is generated by the authorization module 140 when the two verification ID's are equal but not when they differ (or when the verification ID retrieved by the application 114 is equal to the verification ID stored by the authorization module 140). Hence, the generation of the unique verification ID (e.g., a nonce) by the (valid) application 114 can reduce the risk of a malicious software to claim the access token as the malicious software does not generate the verification ID (that is unique only to the valid application 114). Known operating systems on mobile devices 110 cannot prevent a malicious software (e.g., spyware, virus, etc.) from claiming the URL scheme associated with a valid application 114. Hence in known operating systems, even though a valid application 114 may start the process of obtaining the access token as shown in FIG. 2, if a malicious application has been able to claim the URL scheme, the operating system on the (mobile) device 110 can pass the URL with the authorization code to the malicious application instead of the valid application 114. The malicious software can then exchange the authorization code for the access token and use it on making API calls. Although by implementing the access token issuing system described in FIGS. 1 and 2 a malicious software may still be able to intercept the authorization code, the malicious application, however, will not be able to exchange the authorization code with the access token as the malicious software cannot provide a valid verification ID. Only a valid application 114 can provide the valid verification ID and hence only a valid application 114 can obtain the access token.

Figure 3:
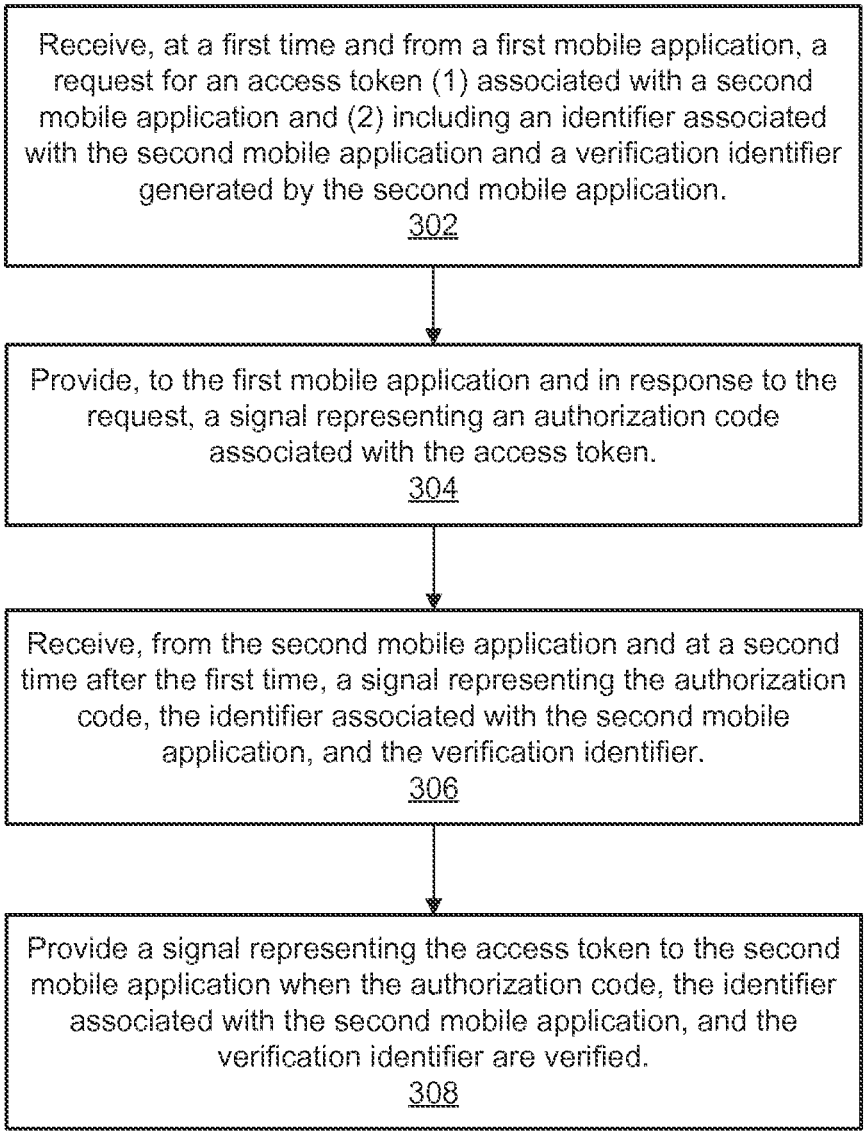
FIG. 3 is a flow chart illustrating a method for issuing an access token for an application by an authorization module, according to an embodiment.

FIG. 3 is a flow chart illustrating a method for issuing access tokens for an application by an authorization module, according to an embodiment. The method 300 includes receiving at, for example, an authorization module at a first time and from a first mobile application, a request for an access token (1) associated with a second mobile application and (2) including an identifier associated with the second mobile application and a verification identifier generated by the second mobile application, at 302. The first mobile application can be, for example, any native mobile browser installed on a mobile device that can connect to the Internet via, for example, a cellular network and/or a wireless local area network (LAN), using standard Hypertext Transfer Protocol (HTTP) over Transmission Control Protocol/Internet Protocol (TCP/IP) and can display web pages written in, for example, HyperText Markup Language (HTML), Extensible HyperText Markup Language (XHTML Mobile Profile WAP 2.0), Wireless Markup Language (WML), and/or the like. Examples of browsers include the Android browser, the Blackberry browser, Safari, Internet Explorer Mobile browser, Firefox for mobile browser, Polaris browser, and/or the like. The second mobile application can be, for example, any native mobile application installed on a mobile device or a web-browser-based application that is configured to receive access tokens from the authorization module and cause the processor to execute specific operations associated with particular functions in an enterprise.

At 304, a signal representing an authorization code associated with the access token is provided to the first mobile application and in response to the request. The signal representing the authorization code is sent from, for example, the authorization module. As described above, the authorization module can send to the first mobile application (browser) a signal that redirects the browser to a network device or resource associated with a uniform resource locator (URL) that includes the authorization code and a scheme the application is configured to handle (not recognized by the browser). The authorization code can be a random or pseudo-random string of numbers that is generated at the authorization module that is associated with an application installed on the device for a user.

At 306, a signal representing the authorization code, the identifier associated with the second mobile application, and the verification identifier is received at, for example, the authorization module, at a second time after the first time. As described above, the verification identifier (or verification ID) can be, for example, a string of arbitrary random or pseudo-random numbers (e.g., a cryptographic nonce) issued so that this verification ID is not reused in any replay attacks. To ensure that the verification ID is used only once, the verification ID can be made to be time-variant, for example, by including a suitably fine-grained timestamp in the value or generating the verification ID with a sufficient number of random bits to ensure a probabilistically insignificant chance of repeating a previously-generated value.

At 308, a signal representing the access token is provided by, for example, the authorization module to the second mobile application when the authorization code, the identifier associated with the second mobile application, and the verification identifier are verified. In some instances, the authorization module can perform this verification by querying a database or a look-up table stored in the memory of the authorization server for an entry that corresponds to the authorization code, verification ID and/or client ID. In other instances, the database or look-up table can be stored in the memory of a different server operatively coupled to the network. As described above, the access token is generated and sent from the authorization module when the first verification identifier (generated in step 302) is equal to the second verification identifier (generated in step 306) and not when they differ. The generation of the unique verification ID (e.g., a nonce) by the (valid) application can reduce the risk of a malicious software to claim the access token because the malicious software does not generate the verification ID (that is unique only to the valid application).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, in some instances, the browser can include the user approval information along with the verification ID and the client ID in the signal sent to the authorization module that requests an access token for the application. In such instances, step 218 can be performed concurrently with step 214 in FIG. 2 and step 216 can be avoided.

What is claimed is:

1. An apparatus, comprising:
an authorization module implemented in at least one of a memory or a processing device, the authorization module configured to receive, at a first time and from a first mobile application, a request for an access token associated with a second mobile application, the request including an identifier associated with the second mobile application, and a first random verification identifier generated by the second mobile application, the authorization module configured to provide, to the first mobile application and in response to the request, a signal representing an authorization code associated with the access token,
the authorization module configured to receive, from the second mobile application and at a second time after the first time, a signal representing the authorization code, the identifier associated with the second mobile application, and a second random verification identifier, the authorization module configured to provide a signal representing the access token to the second mobile application based at least in part on the first random verification identifier being equal to the second random verification identifier.

2. The apparatus of claim 1, wherein the request includes a uniform resource locator (URL) associated with an address of the authorization module, the URL including the identifier associated with second mobile application and the first random verification identifier, the authorization module configured to store an association between the first random verification identifier and the identifier associated with the second mobile application.

3. The apparatus of claim 1, wherein the first mobile application is a web browser application.

4. The apparatus of claim 1, wherein the authorization module is configured to not provide the first random verification identifier to the first mobile application or the second mobile application.

5. The apparatus of claim 1, wherein the access token is an Open Authorization (OAuth) access token.

6. The apparatus of claim 1, wherein the authorization module is configured to receive, from a user of the first mobile application, a signal representing approval to provide the access token to the second mobile application prior to providing the authorization code associated with the access token to the first mobile application.

7. The apparatus of claim 1, wherein the authorization module is configured to provide the authorization code associated with the access token to the first mobile application by providing, to the first mobile application, a signal representing a uniform resource locator (URL) that (1) includes the authorization code, and (2) the second mobile application is configured to handle.

8. The apparatus of claim 1, wherein the second mobile application is a native mobile application on a mobile device.

9. A non-transitory processor-readable medium storing code representing instructions to be executed by a processor, the code comprising code to cause the processor to:
   receive, at a first time and from a first mobile application, a request for an access token associated with a second mobile application, the request including an identifier associated with the second mobile application and a verification identifier generated by the second mobile application;
   provide, to the first mobile application and in response to the request, a signal representing an authorization code associated with the access token;
   receive, from the second mobile application and at a second time after the first time, a signal representing the authorization code, the identifier associated with the second mobile application, and the verification identifier; and
   provide a signal representing the access token to the second mobile application when the authorization code, the identifier associated with the second mobile application, and the verification identifier are verified.

10. The non-transitory processor-readable medium of claim 9, wherein the first mobile application is a web browser application, the code to cause the processor to provide includes code to cause the processor to provide, to the web browser application, a uniform resource locator (URL) (1) unrecognizable by the web browser and (2) including the authorization code.

11. The non-transitory processor-readable medium of claim 9, further comprising code to cause the processor to:
   receive, from a user of the first mobile application, approval to provide the access token to the second mobile application prior to providing the authorization code associated with the access token to the first mobile application.

12. The non-transitory processor-readable medium of claim 9, wherein the access token is an Open Authorization (OAuth) access token.

13. The non-transitory processor-readable medium of claim 9, wherein the request includes a uniform resource locator (URL) associated with an address of an authorization module.

14. The non-transitory processor-readable medium of claim 9, further comprising code to cause the processor to:
   store an association between the verification identifier and the identifier associated with the second mobile application.

15. An apparatus, comprising:
   a first mobile application implemented in at least one of a memory or a processing device, the first mobile application configured to generate a random verification identifier, the first mobile application configured to initiate a second mobile application such that the second mobile application sends a signal representing the random verification identifier and an identifier associated with the first mobile application to an authorization module at a first time,
   the first mobile application configured to receive, at a second time after the first time, a signal representing an authorization code, the authorization code provided within an address associated with the first mobile application,
   the first mobile application configured to provide a signal representing the random verification identifier and the authorization code to the authorization module, the first mobile application configured to receive a signal representing an access token associated with the first mobile application based at least in part on the authorization module validating the random verification identifier and the authorization code.

16. The apparatus of claim 15, wherein the second mobile application is a web browser application.

17. The apparatus of claim 15, wherein the address associated with the first mobile application is a uniform resource locator (URL) (1) that includes the authorization code; and (2) from which the second mobile application is configured to extract the authorization code.

18. The apparatus of claim 15, wherein the access token is an Open Authorization (OAuth) access token.

19. The apparatus of claim 15, wherein the first mobile application is configured to provide a signal representing an address associated with the authorization module to the second mobile application when initiating the second mobile application.

20. The apparatus of claim 15, wherein the first mobile application is configured to provide the access token to an application module associated with the first mobile application in response to receiving the signal representing the access token.

* * * * *